United States Patent [19]

Dietrich

[11] Patent Number: 5,522,718
[45] Date of Patent: Jun. 4, 1996

[54] APPARATUS FOR THE PRODUCTION OF CORRUGATED TUBING FROM THERMOPLASTIC SYNTHETIC RESIN

[75] Inventor: Karl Dietrich, Rain am Lech, Germany

[73] Assignee: Drossbach GmbH & Co. KG, Rain am Lech, Germany

[21] Appl. No.: 253,790

[22] Filed: Jun. 3, 1994

[30] Foreign Application Priority Data

Jun. 3, 1993 [DE] Germany .......................... 43 18 514.2

[51] Int. Cl.⁶ ........................... B29C 33/36; B29D 23/18
[52] U.S. Cl. ........................... 425/325; 264/286; 264/508; 425/336; 425/396
[58] Field of Search ................... 425/233, 325, 425/326.1, 336, 337, 387.1, 388, 392, 395, 396, 453; 264/508, 286

[56] References Cited

U.S. PATENT DOCUMENTS

| | | |
|---|---|---|
| 4,212,618 | 7/1980 | Hegler et al. . |
| 4,365,948 | 12/1982 | Chaplain ................................. 425/336 |
| 4,787,598 | 11/1988 | Rahn et al. ............................. 425/335 |
| 5,372,774 | 12/1994 | Lupke ..................................... 425/233 |

FOREIGN PATENT DOCUMENTS

| | | |
|---|---|---|
| 0007556 | 2/1980 | European Pat. Off. . |
| 1918336 | 11/1969 | Germany . |
| 1231682 | 5/1971 | United Kingdom . |

OTHER PUBLICATIONS

Brochure of Deutsche Star GmbH "Das Linear-Programm"—Jun. 13, 1989.

Primary Examiner—Jay H. Woo
Assistant Examiner—Joseph Leyson
Attorney, Agent, or Firm—Jacobson, Price, Holman & Stern

[57] ABSTRACT

An apparatus for the production of corrugated tubing from thermoplastic synthetic resin including a shaping path following an extrusion head of an extruder and composed of a guide which is arranged in a frame and on which mold halves, fitted together in a pair at an inlet to define annular molds in a compact train as a travelling mold moving with the tube are advanced by at least one drive pinion arranged at an initial part of the shaping path, the pinion being in mesh with racks on the fitted together mold halves. At an exit point following the shaping path, the mold halves are separated from one another and are gripped by gripping arms provided with coupling devices and area shunted back to the inlet of the shaping path. The gripping arms are bearinged by drives in a movable fashion on carriages. The carriages are able to be reciprocated by drives on guides on return paths parallel to the shaping path. In order to simply control the operation of the gripping arms while having a simple and sturdy mechanical design the gripping arms are arranged to be moved in guides of such carriages in a direction which is exclusively transverse in relation to the path of movement of the carriages.

3 Claims, 1 Drawing Sheet

APPARATUS FOR THE PRODUCTION OF CORRUGATED TUBING FROM THERMOPLASTIC SYNTHETIC RESIN

FIELD OF THE INVENTION

The invention relates to an apparatus for the production of corrugated tubing from thermoplastic synthetic resin comprising means defining a shaping path following the extrusion head of an extruder and composed of a guide which is arranged in a frame and on which mold halves, respectively fitted together in a pair in an inlet to define annular molds in a compact train as a travelling mold moving with the tube are advanced by at least one drive pinion arranged in the initial part of the shaping path, the pinion being in mesh with racks on the fitted together mold halves, means defining an outlet following the shaping path, in which the mold halves are separated from one another and are gripped by gripping arms provided with coupling devices and are shunted back into the inlet, the gripping arms being bearinged by means of drives in a movable fashion on carriages, the carriages being able to be shunted to and fro by drives on guides on return paths parallel to the shaping path, and means controlling the movements of the gripping arms and of the carriages.

BACKGROUND OF THE INVENTION

For the production of corrugated tubing, which is mostly plastic tubing provided with transverse corrugations and more particularly annular or helical corrugations, it is a known practice to mount mold halves in two endless, circulating chains so that following the head of an extruder they are thrust together in the shaping path to give two mutually parallel rows in each of which the mold halves of the respective row constitute hollow molds arranged in a compact train as a travelling mold moving with the tube. These known devices are suitable for the production of small diameters of corrugated tubing, since it is possible to tolerate the disadvantage that the mold halves have to be moved close together along the return paths as well.

If however corrugated tubing with a larger diameter is to be produced, it is necessary to utilize mold halves of suitably large dimensions, whose manufacture is an elaborate process and which involve substantial capital expenditure. In order to make do with the minimum number of mold halves, apparatus has consequently been proposed, in which the mold halves are solely moved together in the shaping path as a train in close succession, whereas they are shunted back separately at a high speed along the return paths so that it is basically only necessary to have one mold half in each return path and accordingly the number of mold halves required for the production of corrugated tubes is reduced to a minimum.

In a device disclosed in the patent publication EP 0 270 694 B for the production of corrugated tubing the conveying device for shunting the mold halves back along the return paths consists of return conveyors composed of two return conveyors, extending along the shaping or working path at a distance from it and of four transverse conveyors which shift the mold halves between the inlet and outlets on the one hand and the return paths in the transverse direction on the other hand. Underneath the mold half path each of the return conveyors possesses an endless traction member comprising a run circulating in the direction of conveying of the respective conveyor. In this respect the traction members bear entrainment means, which at the start of the conveying path come into engagement with the mold halves, entrain the same and at the end of the return path come out of engagement with the mold halves. While this known apparatus ensures a completely satisfactory return movement of the mold halves along the return path, there are however certain difficulties in connection with the transverse shifting of the mold halves by means of transverse conveyor, since such conveyor must ensure a fitting together of the mold halves without any jamming and skew running in the inlet and a correspondingly free drawing apart of the mold halves at the outlet.

In the case of an apparatus disclosed in the patent publication EP 0 007 556 B of the type initially mentioned problems in connection with the fitting together of the mold halves without skew running and jamming together of the mold halves at the inlet of the shaping path and the drawing apart of the mold halves at the outlet of the working path are solved by designing the gripping arms of the carriage in the form of pivotally mounted pivot arms, which, owing to having an appropriate control means for the pivot movement render it possible for a pivotal component to be combined with the translatory carriage movement with the result that the mold halves, when moving into the shaping path at the inlet thereof and when leaving the shaping path at the outlet thereof, are able to be guided along the desired oblique and curved cam tracks. This known device does however suffer from the disadvantage of requiring elaborate control means in order to combine the pivotal movement of the gripping arms with the movement in translation of the carriages to get the desired guide paths for the mold halves and from the further disadvantage that the bearing means for the pivot arms have to be very massively dimensioned for them to be able to transmit the necessary moments in view of the substantial weight of the pivot arms. Furthermore for the known pivot arm design additional measures have to be taken to prevent the same from exerting a twisting effect on the mold halves as the same are moved out of the outlet and are shunted back to the inlet.

In the case of the known device the pivot arms are hence designed in the form of parallel link systems, which so pivot the mold halves that the same remain parallel to themselves during pivotal movements. The known device therefore as well calls for an elaborate and expensive design owing to the form of the pivot arms in the form of parallel link arrays.

SUMMARY OF THE INVENTION

One object of the invention is accordingly to provide an apparatus of the type initially mentioned, in the case of which the gripping arms may be controlled in a simple fashion while at the same time having a simple and strong mechanical design.

In the case of an apparatus of the sort noted initially this object is to be attained by design such that the gripping arms are arranged to be moved in guides of such carriage in a direction which is exclusively transverse in relation to the path of movement of the same. The apparatus in accordance with the invention renders possible a simple control of the carriages and of the gripping arms running in the same for movement which is exclusively in the transverse direction, since both of them are only able to perform movements which are at a right angle to each other and which may be represented in a coordinate system. Furthermore each gripping arm may be bearinged in a simple manner in each carriage, since it consists of a straight arm part, whose bearing points on the carriage are at such a large distance apart that the rocking moment transmitted to the carriage by the same may be taken up, while at the same time having a simple mechanical design and while making it a simple matter for the designer to adjust the bearing reactions. Since the gripping arm is only able to perform transverse movements at a right angle to the guide path of the carriage, it is furthermore possible to do without any additional measures in order to prevent undesired twisting movement of the mold halves while being conveyed.

BRIEF DESCRIPTION OF THE DRAWINGS

One working embodiment of the invention will now be described with reference to the accompanying drawings in more detail.

DETAILED DESCRIPTION OF THE PREFERRED EMBODIMENTS

Figure 2:
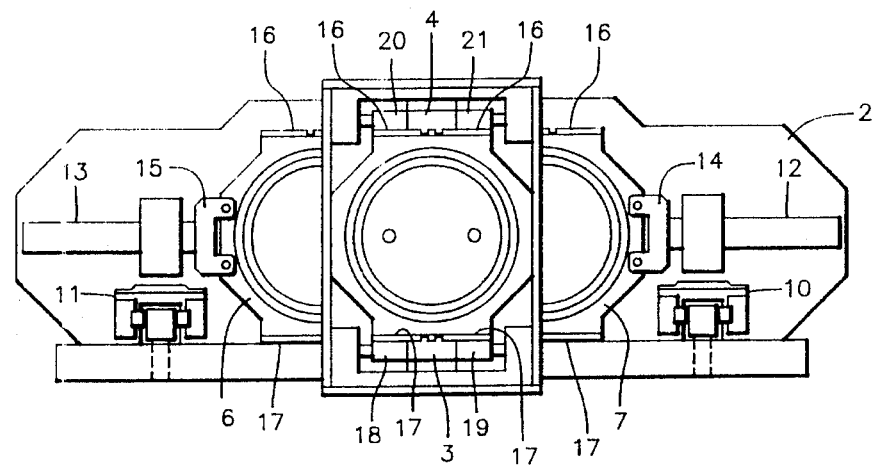
FIG. 2 is a rear elevation of the apparatus in accordance with FIG. 1 looking in the direction of the arrow Z in FIG. 1.
Figure 1:
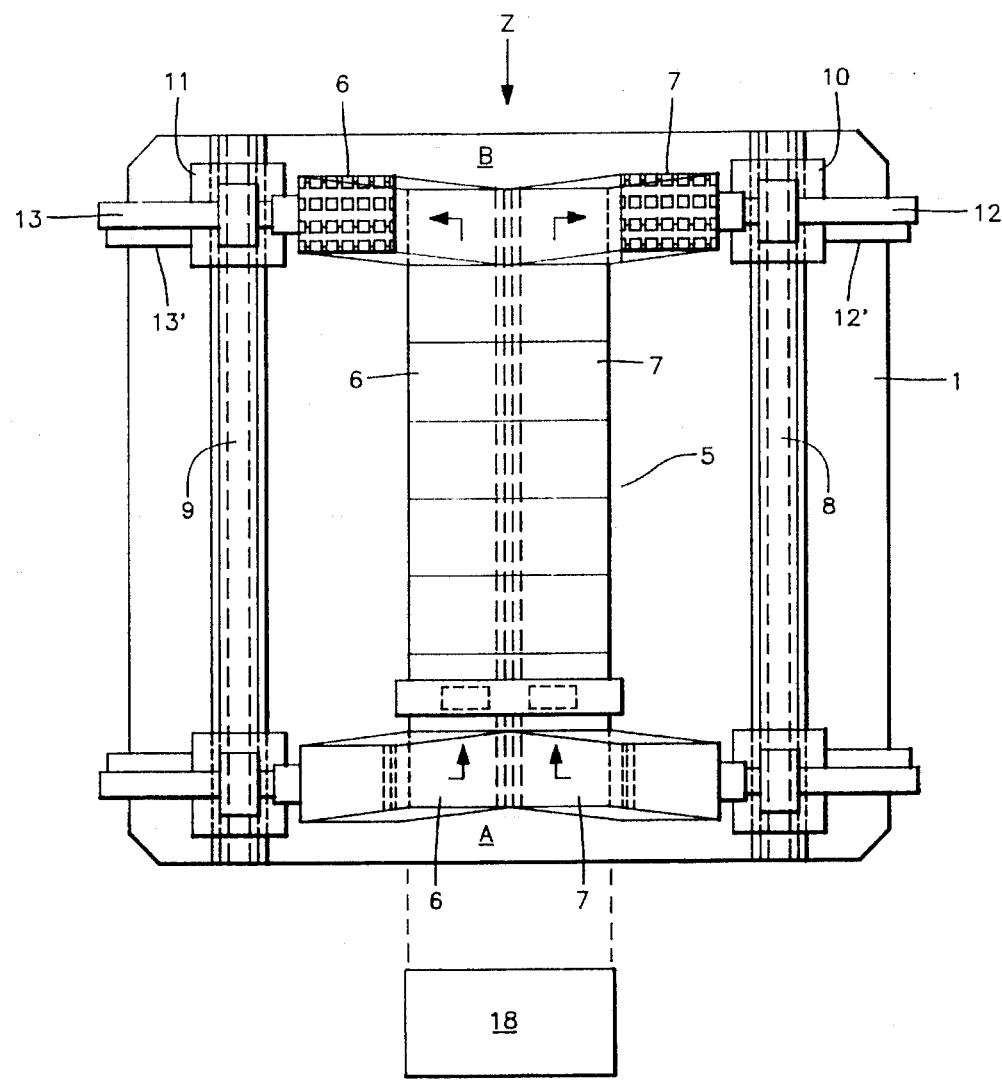
FIG. 1 is a diagrammatic plan view of the apparatus for the production of corrugated tubing from thermoplastic synthetic resin.

In the machine frame 2 having a base member 1 central guides 3 and 4 are provided for the mold halves 6 and 7 assembled in the shaping or working path 5 together in pairs so as to respectively constitute a moving mold for the tube coming from the head of an extruder indicated by block 18.

Parallel guides 8 and 9 are provided to the side of the shaping path on the main frame 1 and bear carriages 10 and 11 which are moved along by drives, not illustrated, for motion between the inlet A or entry point and the outlet B or exit point. Straight gripping arms 12 and 13 are mounted in the carriages 10 and 11 in guides allowing transverse sliding. For causing such transverse sliding movement of the gripping arms 12 and 13 in the carriages 10 and 11 drives are provided, which may consist of lead screws or hydraulic piston and cylinder units and which are schematically shown at 12' and 13'.

At inner, mutually adjacent ends thereof the gripping arms 12 and 13 bear coupling members 14 and 15, adapted for coupling engagement with corresponding mating coupling members on the mold halves 6 and 7. It is understood that the coupling members include means for simple coupling up and uncoupling, which are not shown.

The mold halves 6 and 7 assembled as mold sections in the form of closed rings at the entry point A or inlet following the head of the extruder are advanced by pinions 18, 19, 20 and 21 bearinged in the frame along the working path 5, such pinions meshing with racks or teeth 16, 17 respectively provided on the top and lower sides of the mold halves 6 and 7.

By the provision of a suitable control mechanism for the linear drives of the carriages 10 and 11 and of the gripping arms 12 and 13, the mold halves 6 and 7 are so moved together at the entry point on the oblique paths that they are advanced along and through the shaping path after contact with the preceding, assembled mold halves at a synchronous working rate and are simultaneously moved together in the transverse direction until they abut together constituting closed annular mold elements.

At the exit point or outlet B the mold halves 6 and 7 are moved apart on correspondingly oblique paths transverse to the direction of travel until on the return paths they arrive back at the entry point.

I claim:

1. An apparatus for the production of corrugated tubing from thermoplastic synthetic resin, said apparatus comprising:

a shaping path located downstream from an extrusion head of an extruder and including a guide arranged in a frame and on which mold halves, respectively fitted together in a pairs at an inlet of the shaping path to define annular molds in a compact train as a travelling mold moving with a tube, are advanced by at least one drive pinion, said pinion being in mesh with racks on the fitted together mold halves, and an outlet following the shaping path, in which the mold halves of a single pair of mold halves are separated from one another and are gripped by gripping arms provided with coupling devices and said single pair of mold halves are shunted back to said inlet by movement with said gripping arms, said gripping arms being bearinged by drives in a movable fashion on carriages, said carriages being reciprocable on guides on return paths located parallel to the shaping path, said gripping arms being arranged to be moved by said drives on said carriages in a direction exclusively transverse in relation to the path of movement of said carriages to separate or fit together said gripped mold halves.

2. An apparatus for the production of corrugated tubing from thermoplastic synthetic resin, said apparatus comprising:

a shaping path located downstream from an extrusion head of an extruder and including a guide and on which mold halves, respectively fitted together in pairs at an inlet of the shaping path to define annular molds in a compact train as a travelling mold moving with a tube, are advanced by at least one drive pinion, said pinion being in mesh with racks on the fitted together mold halves, and an outlet following the shaping path, in which the mold halves of a single pair of mold halves are separated from one another and are gripped by gripping arms provided with coupling devices and said single pair of mold halves are shunted back to said inlet by movement with said gripping arms, said gripping arms being bearinged by drives in a movable fashion on carriages, said carriages being reciprocable on guides on return paths located parallel to the shaping path, said gripping arms being arranged to be moved by said drives on said carriages in a direction exclusively perpendicular in relation to the path of movement of said carriages to separate or of fit together said gripped mold halves.

3. An apparatus for the production of corrugated tubing from thermoplastic synthetic resin, said apparatus comprising:

a shaping path located downstream from an extrusion head of an extruder and including a guide arranged in a frame and a plurality of mold halves respectively fitted together in pairs at an inlet of the shaping path to define annular molds in a train as a travelling mold moving with a tube, said pairs being advanced on said guide by at least one drive pinion, said pinion being in mesh with racks on the fitted together mold halves, and an outlet located at an end of the shaping path, said mold halves of a single pair of mold halves being separated from one another at said outlet, gripping arms provided with coupling devices for gripping said mold halves of a single pair, said gripping arms being driven with said single pair of mold halves in a movable fashion on carriages from said outlet to said inlet, said carriages being reciprocable on guides on return paths located parallel to the shaping path, said gripping arms being arranged to be moved by drives on said carriages in a direction exclusively perpendicular in relation to the path of movement of said carriages to separate or fit together said gripped mold halves.

* * * * *